(12) United States Patent
Cheng

(10) Patent No.: US 10,422,965 B2
(45) Date of Patent: Sep. 24, 2019

(54) FIBER OPTIC CONNECTOR

(71) Applicant: Steve Cheng, Emerald Hills, CA (US)

(72) Inventor: Steve Cheng, Emerald Hills, CA (US)

(73) Assignee: Steve Cheng, Emerald Hills, CA (US)

( * ) Notice: Subject to any disclaimer, the term of this patent is extended or adjusted under 35 U.S.C. 154(b) by 0 days.

(21) Appl. No.: 15/881,110

(22) Filed: Jan. 26, 2018

(65) Prior Publication Data
US 2019/0235182 A1   Aug. 1, 2019

(51) Int. Cl.
*G02B 6/36* (2006.01)
*G02B 6/40* (2006.01)
*G02B 6/38* (2006.01)
*G02B 6/44* (2006.01)

(52) U.S. Cl.
CPC .......... *G02B 6/3871* (2013.01); *G02B 6/3825* (2013.01); *G02B 6/3866* (2013.01); *G02B 6/3882* (2013.01); *G02B 6/3891* (2013.01); *G02B 6/4478* (2013.01)

(58) Field of Classification Search
CPC .... G02B 6/3825; G02B 6/3871; G02B 6/389; G02B 6/3891; G02B 6/3894; G02B 6/40; G02B 6/406; G02B 6/4428
See application file for complete search history.

(56) References Cited

U.S. PATENT DOCUMENTS

| 5,177,809 | A | 1/1993 | Zeidler |  |
|---|---|---|---|---|
| 5,218,659 | A | 6/1993 | Schneider |  |
| 5,384,885 | A * | 1/1995 | Diner | G02B 6/266 385/140 |
| 5,748,819 | A * | 5/1998 | Szentesi | G02B 6/2551 385/60 |
| 5,870,515 | A * | 2/1999 | Ott | G02B 6/3825 385/134 |
| 7,272,283 | B2 | 9/2007 | Temple, Jr. et al. |  |
| 8,113,722 | B2 | 2/2012 | Scadden et al. |  |
| 9,606,298 | B2 | 3/2017 | Sato et al. |  |
| 9,618,704 | B2 | 4/2017 | Dean, Jr. et al. |  |
| 2001/0007641 | A1* | 7/2001 | Jovanovich | G01N 30/6039 422/538 |
| 2009/0305542 | A1* | 12/2009 | Masuzaki | H01R 13/625 439/335 |
| 2013/0230284 | A1* | 9/2013 | Tamekuni | G02B 6/3846 385/78 |
| 2015/0177467 | A1* | 6/2015 | Gniadek | G02B 6/3894 385/58 |
| 2016/0266326 | A1* | 9/2016 | Gniadek | H01R 24/66 |
| 2017/0160493 | A1 | 6/2017 | Lin et al. |  |

FOREIGN PATENT DOCUMENTS

CN       104730667 A    6/2015

* cited by examiner

*Primary Examiner* — Michelle R Connelly
(74) *Attorney, Agent, or Firm* — Kramer Amado, P.C.

(57) ABSTRACT

A fiber optic connector assembly, including a boot portion connected to a fiber optic cable, a fixed body portion connected to the boot portion, a rotatable coupler connected to the fixed body portion and configured to rotate about the fixed body portion, a ferrule connected to the rotatable coupler and configured to rotate with the rotatable coupler about the fixed body portion, and a bulkhead adapter configured to receive the rotatable coupler after the rotatable coupler has been turned in one direction and released in another direction.

12 Claims, 13 Drawing Sheets

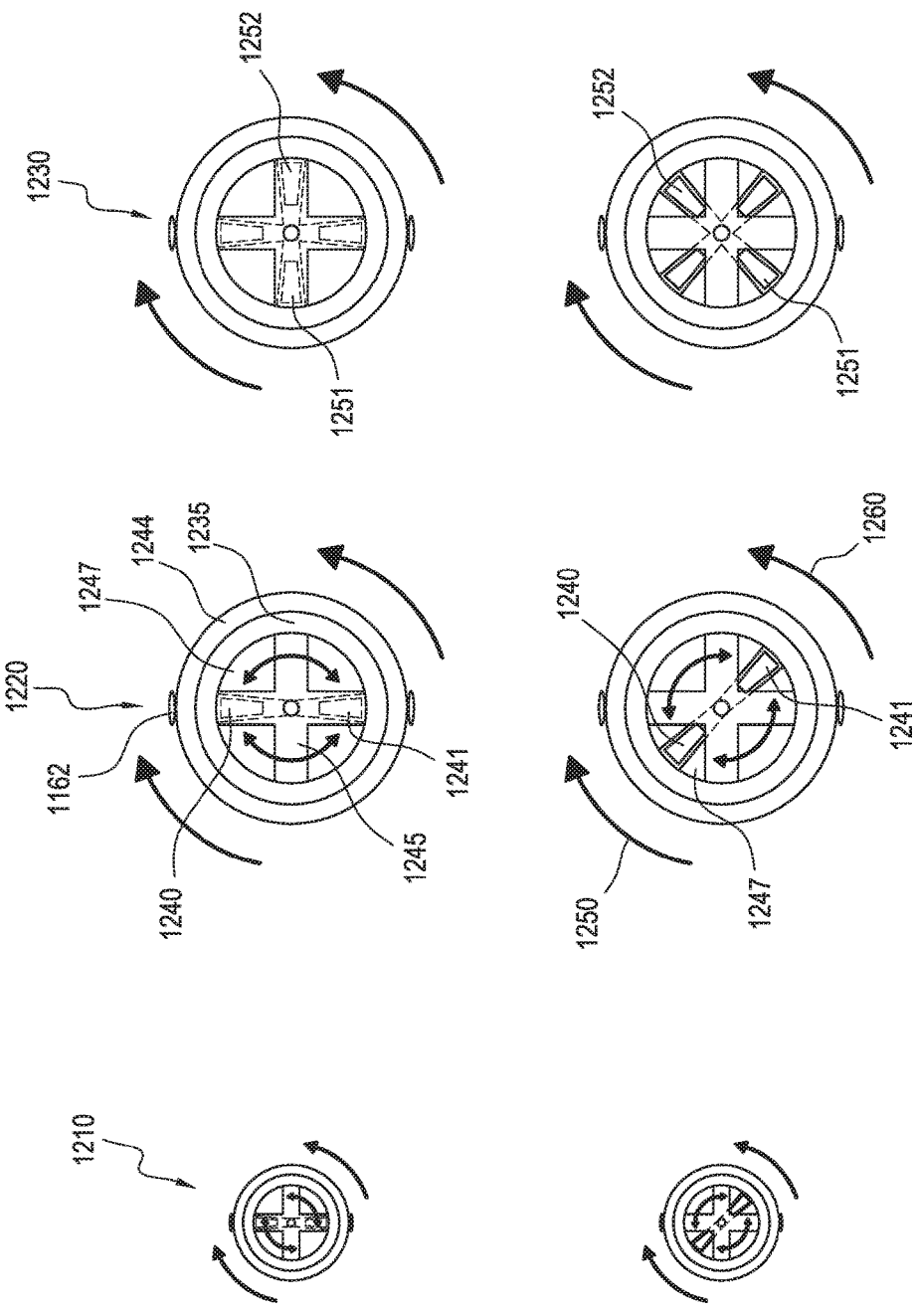

FIBER OPTIC CONNECTOR

TECHNICAL FIELD

The invention relates generally to cable connectors, and more specifically to fiber optic cable connectors having self-cleaning mechanisms and connectable to bulkhead adapters.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments include a fiber optic connector assembly, including a boot portion connected to a fiber optic cable, a fixed body portion connected to the boot portion, a rotatable coupler connected to the fixed body portion and configured to rotate about the fixed body portion, a ferrule connected to the rotatable coupler and configured to rotate with the rotatable coupler about the fixed body portion, and a bulkhead adapter configured to receive the rotatable coupler after the rotatable coupler has been turned in one direction and released in another direction.

The rotatable coupler may include at least one alignment token to interface with the bulkhead adapter port and the bulkhead adapter includes at least one alignment groove to interface with the rotatable coupler.

The bulkhead adapter port may include at least one alignment token to interface with the rotatable coupler and the rotating rotatable coupler includes at least one alignment groove to interface with the bulkhead adapter.

The ferrule of a first fiber optic connector may include a guiding pin or a receiving gusset to connect to a ferrule of a second fiber optic connector.

The guiding pin in the first fiber optic connector may be removable and able to be placed into a receiving gusset of a second fiber optic connector to allow for fiber optic connector gender changes.

The bulkhead adapter may include an alignment pin insertion hole to receive a connection between a first fiber optic connector and a second fiber optic connector.

Two alignment grooves may be placed in opposing formations on either the rotatable coupler or bulkhead adapter to support quick polarity flips.

The ferrule may include at least one fiber plane and at least one bank of fiber strands.

Two or four fiber planes may be positioned in a mirror configuration to support quick polarity flips.

The ferrule face may expose at least two fiber planes multiplying the number of fiber planes and bank of fiber strands.

A cleaning media agent may be disposed within the ferrule. A cleaning media agent may be disposed within the bulkhead adapter body.

Various embodiments also include a method of providing fiber optic connectivity, including gripping a rotatable coupler of a fiber optic connector at a grip portion thereof, inserting the rotatable coupler into a bulkhead adapter in a straight direction, turning the rotatable coupler in a clockwise or counterclockwise direction to increase a tension of the spring while pushing the rotatable coupler forward, and releasing the rotatable coupler such that the rotatable coupler rotates in a counter clockwise direction and locks the fiber optic connector into the bulkhead adapter.

The method may include releasing the rotatable coupler when the rotatable coupler has rotated in a clockwise or counterclockwise direction and reached a stop point in an alignment groove on the bulkhead adapter.

The method may include inserting the rotatable coupler into a port of the bulkhead adapter.

The method may include inserting an alignment token of the rotatable coupler or bulkhead adapter into an alignment groove of an adjoining bulkhead adapter or rotatable coupler.

The method may include cleaning a front portion of the rotatable coupler when inserting the rotatable coupler into the bulkhead adapter.

Various embodiments may also include a fiber optic connector assembly, including a boot portion connected to a fiber optic cable, a fixed body portion connected to the boot portion, a shrouded coupler connected to the fixed body portion, the shrouded coupler including a shroud disc and cleaning media agent at one end thereof, a ferrule connected to the rotatable coupler and configured to couple to the shroud disc of the shrouded coupler, and a bulkhead adapter configured to receive the shrouded coupler and provide connection for a fiber optic cable.

The shrouded coupler may include a guiding pin extending through a ferrule face of the ferrule and the shrouded coupler extends and covers the guiding pin, ferrule face, and ferrule.

The shroud disc may be removable from the shrouded coupler.

The shrouded coupler may include a rotatable coupler region that rotates about a fixed ferrule to move the ferrule towards the cleaning media.

The shrouded coupler may include a coupler region and a rotatable ferrule that is configured to rotate inside the coupler region towards the cleaning media.

The ferrule may have a cylindrical shape to extend out of the shrouded coupler to interface with the shroud disc.

The shroud disc may include cutout gaps to receive banks of fiber strands within the ferrule.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

FIGS. 12A-12C illustrate front views of various fixed shroud couplers in accordance with FIG. 11.

DETAILED DESCRIPTION

Figure 1:
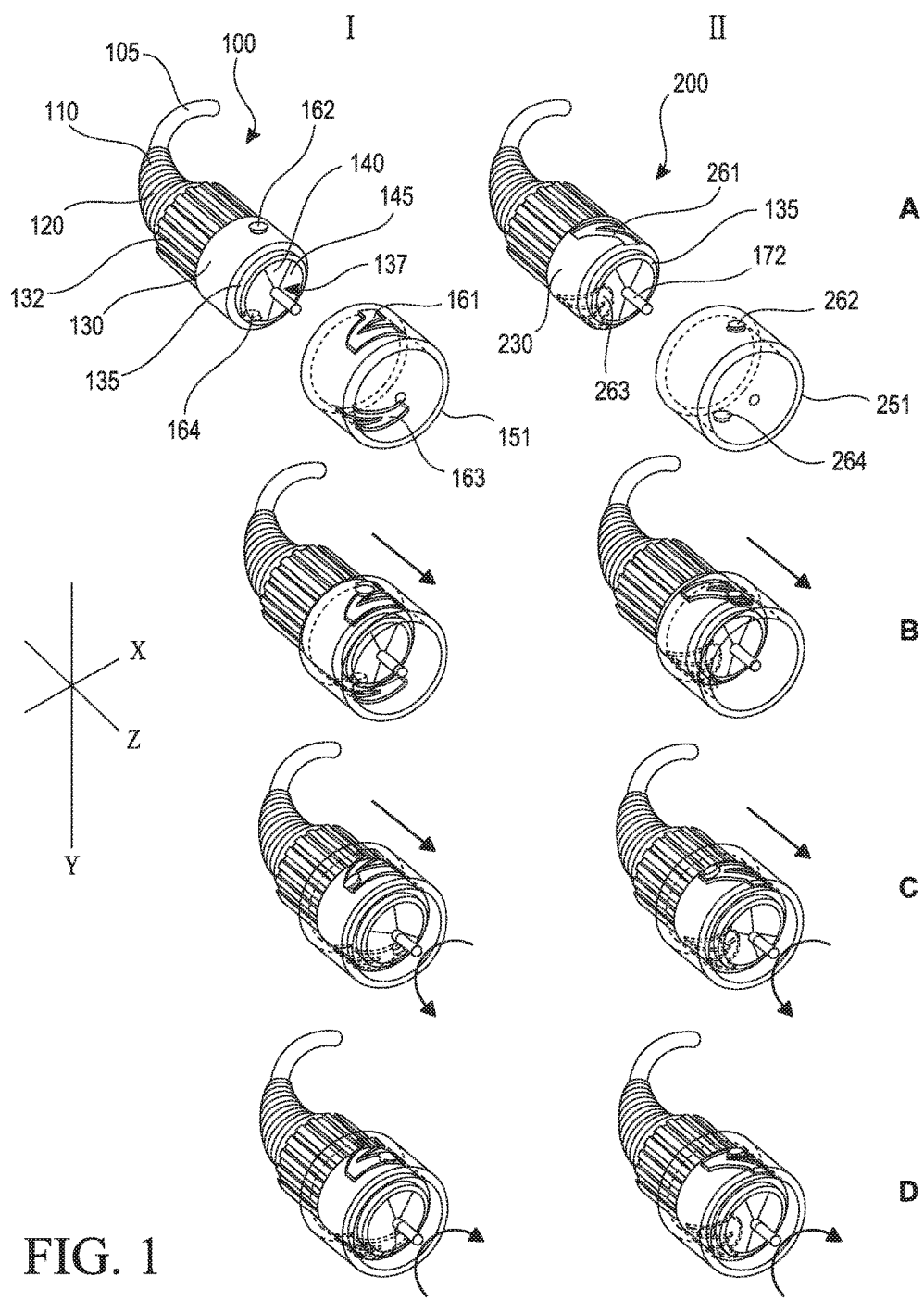
FIG. 1 illustrates two configurations of fiber optics connectors and shrouds of bulkhead adapters in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application. When steps of manufacture, process of using, or other method steps are described or claimed, the order of steps given is not constrained by the order presented, and may vary. Terms such as "below," "above," "right," and "left," may be used for relative orientation of a device or apparatus as illustrated in a figure. If an apparatus or component of a figure may be rotated and still function in a similar manner to what is described, the directional terms are not limited to the orientation illustrated in a particular figure. "Below" when rotated may become "right," or "left" or "above." The same holds true for the other directional indicators.

Embodiments described herein include a multi feature, small form factor, fiber optics connector, providing fiber optics connectivity along with the capabilities of high quantity fiber strand counts, low insertion loss, self-cleaning at mating surfaces, ease of access, extended reach, and the possibility of copper or additional multimedia connectivity.

Standard fiber optics connectors which fasten to a compatible bulkhead adapter and join two connector ferrule faces and their embedded fiber optic strands together to continue the wavelength of light, have a number of issues that hinder connectivity performance and limit functionality. Some problems that arise include connector mating surfaces that are susceptible to dirt and debris contamination causing signal degradation and loss. There are connector fastening and releasing mechanisms that require access around the connector head/ferrule to detach them from a bulkhead adapter, requiring extra space around each adapter which limits patch panel port density. Some connector ferrule designs hinder the quantity of fiber strands supported at an optimal or ideal connectivity performance. There can be limited flexibility in fiber strand orientations where flipping polarity of fiber strand sequences cannot be done easily and uniformly. Also, prior art designs limit an ability to provide multiple types of media connectivity within a single connection.

A self-cleaning fiber interconnect surface is included in the present disclosure. Any bit of dirt, debris or physical containment between mated fiber optics connectors can cause signal degradation or a decrease in performance (as measured by dB loss, attenuation, etc.). Standard fiber optic connector ends are exposed to elements and contaminants during shipment and routine handling, added with the typical push-in design for mating the connectors together, which can trap and embed debris onto the fiber optic connector ends impacting connectivity performance.

Embodiments described herein address and resolve these and other issues while providing new features and attributes that enhance connectivity performance, efficiency, flexibility and capacity.

FIG. 1 illustrates two configurations of fiber optics connectors 100 and 200 and ports 151 and 251 of bulkhead adapters 150 and 250 (illustrated in FIGS. 3 and 4) in accordance with embodiments described herein. The fiber optics connector 100 and associated bulkhead adapter port 151 are in column I. The fiber optics connector 200 and associated bulkhead adapter port 251 are in column II. The fiber optics connectors 100 or 200 may be used to connect one fiber optics cable 105 to another (illustrated in FIG. 3), or may be used to couple a fiber optics cable 105 to an infrastructure patch panel (not illustrated). The fiber optics connectors 100 and 200 have a round and cylindrical shape form factor that provides space efficiency along with an extended reach, and allows support of a circular ferrule design, rotating coupler system, and a twist action fasten and release capability thereof.

As illustrated in row "A," the fiber optics connectors 100 and 200 may each include a boot portion 110 that wraps around and securely holds the fiber optic cable 105 within the fiber optics connector 100. The boot portion 110 may be made of polymer or other material as is known in the art. The boot portion 110 protects a termination of the fiber optic cable 105 within an end of the fiber optics connector 100. The material of the boot portion 110 is configured to provide strain relief, allowing for bending of the fiber optic cable 105 at the junction with the fiber optics connector 100. The boot portion 110 may be color coded for easy identification and organization.

The boot portion 110 is assembled to a fixed body portion 120 of the fiber optics connector 100. A size of the fixed body portion 120 starts small near the boot portion and enlarges thereafter. Mounted to the fixed body portion 120 are respective rotatable couplers 130 and 230 having an adjoining circular ferrule 135. The rotatable couplers 130 and 230 and adjoining circular ferrules 135 are configured to rotate around the fixed body portion 120. The rotatable couplers 130 and 230 with their respective adjoining circular ferrules 135 rotate around the fixed body portion 120 with a spring tensioning that has a limited degree of turn, returning back to their original resting position when released. The degree of turn of the rotatable couplers 130 and 230 is based on the particular design of a fiber plane 140 in relation to a cleaning media agent 145 provided within the ferrule 135 or if placed on a face of the bulkhead adapter port 151 (as illustrated in FIG. 5). The cleaning media agent 145 is configured to perform a wiping/cleaning of a surface of an opposing fiber plane 140 during a fasten or release process of the fiber optics connectors 100 or 200. The cleaning media agent 145 may be made of a material that attracts and extracts dirt and debris as it wipes the surface of the fiber plane 140, yet is soft enough not to damage the fiber plane 140 surface and can additionally polish the fiber plane 140 to ensure optimal fiber strand connectivity and performance. The rotatable couplers 130 and 230 may have a connecting grip 132 that may be placed either at the front of the rotatable couplers 130 and 230 adjacent the ferrule 135 or at the rear of the rotatable couplers 130 and 230 adjacent the fixed body portion 120 allowing for extended reach away from a bulkhead adapter port.

The rotatable couplers 130 and 230 are spring actuated rotating assemblies. The rotatable couplers 130 and 230 may be configured with a clockwise turn and counter-clockwise return (i.e. a twist-and-return action). This allows for pre-tensioned fasten and release of the fiber optics connector 100 to a bulkhead, with a simple push, twist, and release of the rotatable couplers 130 and 230 on respective fiber optics connectors 100 and 200. The spring tensioning may have a load setting of about one kilogram. The initial rotation of the rotatable couplers 130 and 230 may be preconfigured to be clockwise or counter-clockwise, in relation to a layout of a track/groove into which the rotatable couplers 130 and 230 are mounted.

Fiber strands may be configured in fiber planes 140. The fiber planes 140 may have banks of fiber strands 143 (illustrated in FIG. 2) included therein. The circular ferrule 135 may have a ferrule face 137 from which the fiber plane and embedded fiber strands are coupled to adjoining fiber strands of a mating connector, or to an infrastructure panel. As the circular ferrule 135 may have the ferrule face 137 form which fiber strands are exposed, the rotatable coupler 130 may be designed to extend out further than the ferrule face 137, creating a shroud or guard that protects the fiber plane 140 and a surface area of the bank(s) of fiber strands 143 against abrasion or contamination during routine handling. When a shroud or covering is used, when inserted into the bulkhead adapter port 151 of a bulkhead adapter, the covering of the rotatable coupler 130 may recede back to expose the ferrule face 137 to ensure proper mating of the fiber surface area.

Figure 3:
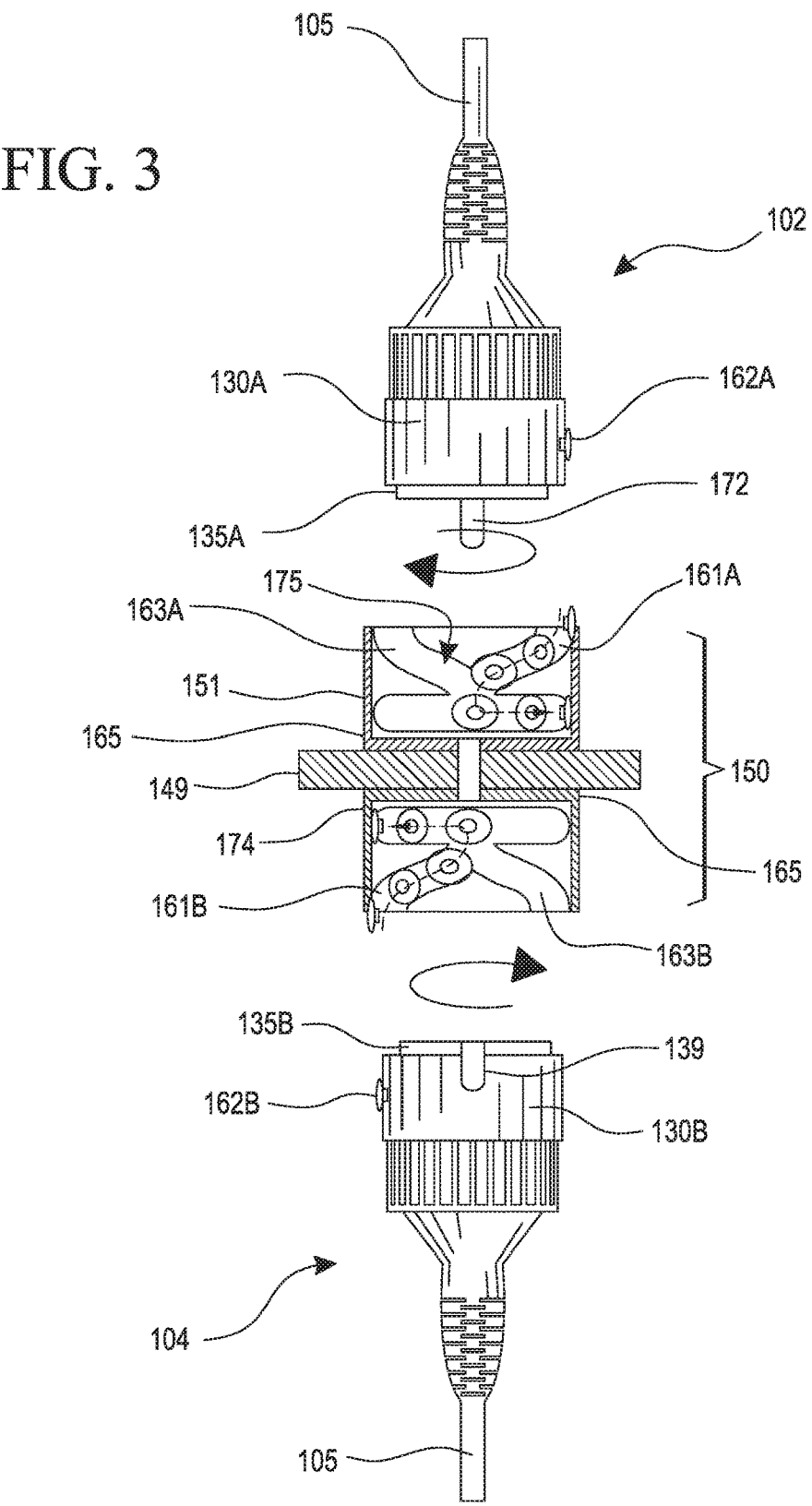
FIG. 3 illustrates a mating connection of fiber optic cable connectors through a bulkhead adapter in accordance with FIG. 1.
Figure 4:
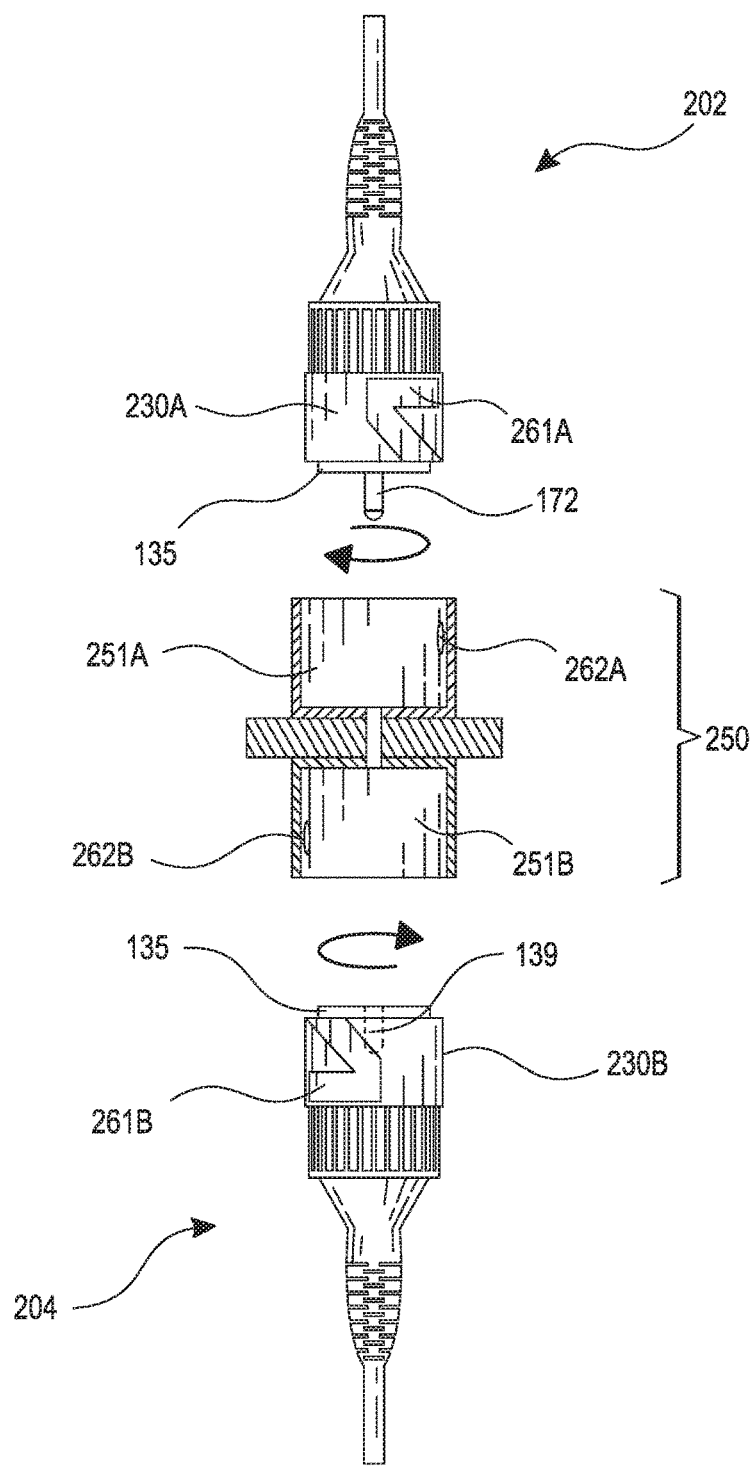
FIG. 4 illustrates another mating connection of fiber optic cable connectors through another bulkhead adapter in accordance with FIG. 1.

The fiber optics connectors 100 and 200 may become part of respective assemblies including bulkhead adapters 150 (illustrated in FIG. 3) and 250 (illustrated in FIG. 4). The bulkhead adapters 150 and 250 may be used to accept and conjoin opposing fiber optics connectors 100 or 200, mating and aligning their circular ferrule faces 137 and the embedded bank(s) of fiber strands 143 together in order to complete fiber optics connectivity. There may also be a mix and match arrangement where a fiber optic connector 100 may connect through a bulkhead adapter to a fiber optic connector 200. The bulkhead adapters 150 and 250 may also serve as ports within the infrastructure patch panel.

Referring to the rotatable coupler 130, the rotatable coupler 130 may include first and/or second alignment tokens 162 and 164, and first and second alignment tracks/grooves 161 and 163. The first alignment token 162 may connect to and slide within a first alignment track/groove 161 on the bulkhead adapter port 151. The first alignment token 162 may be configured as male, and the first alignment track/groove 161 configured as female. The first alignment token 162 may be a key shape module that fits specifically into the first alignment track/groove 161, conjoining and securing the fiber optics connector 100 to the bulkhead adapter 150.

The first alignment token 162 may be configured as primary, or key-up token into the first alignment track/groove 161 on the bulkhead adapter port 151 of the bulkhead adapter 150. This means that the first alignment token 162 may be considered a primary pin that can be used to denote a key-up orientation of the fiber optics connector 100 and fiber strand orientation. A second key-down alignment token 164 is a secondary pin that may provide additional alignment and security, and can denote a key-down orientation of the fiber optics connector 100 and fiber strand orientation.

The first 162 and second 164 alignment tokens are configured to mate the fiber optics connector 100 to the bulkhead adapter 150, while guiding a twist-and-return mating arrangement, which activates a self cleaning action during fasten and release, and providing additional precision to the alignment of ferrule faces and connector ends when secured.

The fiber optics connector 200 in column II is similar to the fiber optics connector 100 and includes alternative alignment tokens 262 and 264 that may be mounted upside down on the inside of a bulkhead adapter port 251. The alignment tokens 262 and 264 may mate with one or more conjoining alignment track/grooves 261 and 263 of another embodiment of a rotatable coupler 230. In column II the alignment track/grooves 261 and 263 may be moved about the alignment tokens 262 and 264. The dual nature of the alignment pins and alignment track/grooves as illustrated and described in FIG. 1 is not limiting. The rotatable coupler 230 may be configured with only a single alignment track/groove, and the bulkhead adapter port 251 may be configured with only a single alignment pin.

Referring to FIG. 1, the alignment token tracks/grooves 161 or 163 accept the first and second alignment tokens 162 and 164, then guide the rotatable coupler 130 through the alignment token track/groove 161 and 163. The tracks/grooves allow a user to rotate the rotatable coupler 130 as it is inserted, and securing the fiber optics connector 100 into its final alignment position within the bulkhead adapter 150.

This twist-and-return action of the rotatable couplers 130 and 230 allow for fastening the fiber optics connectors 100 and 200 by pushing them in, and letting the tracks/grooves guide the rotation of the rotatable couplers 130 and 230. The releasing aspect is performed through another twist of the rotatable couplers 130 and 230 without having to place a user's fingers close to the adjoining circular ferrule 135 or bulkhead adapters 150 or 250. Whether the alignment tokens are placed on the rotatable couplers 130 or 230, or in the bulkhead adapters 150 or 250, the insertion movement of the rotatable couplers 130 or 230 into the bulkhead adapters is the same 150 or 250. The twist-and-return action, in combination with the embedded cleaning media agent 145 may also perform a self-cleaning function of wiping an opposing fiber plane 140 and fiber strand surface, prior to the final mating alignment and mating of the fiber strands together.

Figure 2:
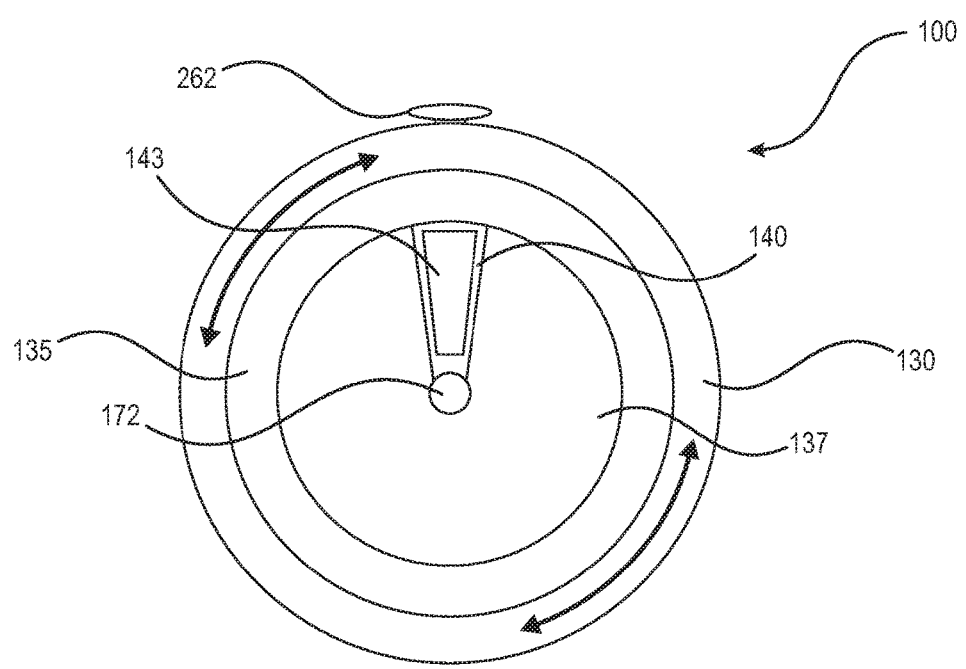
FIG. 2 illustrates a front view of the fiber optic connector and circular ferrule in accordance with FIGS. 1 and 2.

FIG. 2 illustrates a front view of the fiber optic connector 100 and circular ferrule 135 in accordance with FIG. 1. This configuration and like elements described regarding fiber optic connector 100 also apply to the fiber optic connector 200. The circular ferrule 135 may be affixed to the rotatable coupler 130 and rotate along with the rotatable coupler 130 during the twist-and return fasten and release action. A front portion of the circular ferrule 135 is the ferrule face 137. The ferrule 135 and ferrule face 137 may be shaped to specifically host components that pass through and are part of the ferrule 135 and such as an embedded trapezoid sector or other shaped fiber planes 140, radial bank(s) of fiber strands 143, and the cleaning media agent 145 (illustrated in FIG. 1). The fiber planes 140 having bank(s) of fiber strands 143 are not limited to a trapezoid sector shape, but may use other configurations in which to connect fiber strands of mating connectors. For example the fiber planes 140 may be oval, rectangular, square, triangular, or other polygon shape that may enclose a single or group of fiber stands. A layout of the cleaning media agent 145 may be shaped in a similar manner to the fiber planes so that the cleaning media agents 145 is able to adequately wipe the fiber strands. The ferrule face 137 of the ferrule 135 may match and mate to an adjoining/opposing fiber optics connector (not illustrated) to complete fiber optics connectivity. A center guide pin 172 may be used to connect one fiber optic connector 100 to another and provide additional communication ability. A center placement of the center guide pin 172 allows for rotational functionality during fastening and release of the fiber optic connector 100 and also provides precise axial alignment of the fiber planes 140 and fiber strand banks 143 when mated.

FIG. 3 illustrates a mating connection of fiber optic cable connectors 102 and 104 through the bulkhead adapter 150 in accordance with FIG. 1. The bulkhead adapter port 151 may take the form of a sleeve or shroud that accepts the fiber optic connector 100 and also hosts the embedded alignment track/grooves 161 and 163 or mating alignment tokens 262 or 264 depending on the design in use. The bulkhead adapter 150 may have bulkhead mating planes 165 within opposing bulkhead adapter ports 151. The bulkhead mating planes 165 may be disposed on both sides of a body portion 149 of the bulkhead adapter 150. When mounted within the bulkhead adapter port 151, ferrules 135 of the opposing fiber optic connectors 102 and 104 mate through the mating planes 165 within the body portion 149. Opposing ferrules 135 rest against and align two conjoining/mated fiber planes 140 and bank(s) of fiber strands 143 of opposing fiber optic connectors 102 and 104 to make a fiber optic cable connection. When coming together, a cleaning media agent 145 in a first ferrule of the first fiber optic connector 102 may rotate against an opposing ferrule of the second fiber optic connector 104, wiping and cleaning the tips of the fiber strands of the second fiber optic connector 104. Alternatively, or simultaneously, the cleanring media agent 145 of the second fiber optic connector 104 may clean the fiber strands of the first fiber optic connector 102.

Within the bulkhead mating planes 165 or the body portion 149 may be fiber alignment planes where the banks of fiber strands 143 are contained and aligned. The bulkhead port 151 may include a receiving cavity 175 to accept the fiber optic connector 100 and which contains the mating plane 165. The bulkhead adapter 150 may also include its own cleaning wiping area where the body portion 149 can host the fiber cleaning media used to swipe or wipe the fiber planes 140 of the fiber optic connectors 102 and 104 during the twist-and-return fasten and release of the fiber optic connectors 102 and 104 to the bulkhead adapter 150.

The bulkhead adapter 150 may further include a panel clip or mounting screw (not illustrated) embodded in the body portion 149 that is used to affix and secure the bulkhead adapter 150 onto an infrastructure path panel or transceiver.

The bulkhead adapter 150 furth includes an alignment pin insertion hole 174 within the body portion 149 and bulkhead mating plane 165 to accept the center guide pin 172 of an inserted fiber optic connector 102. The center guide pin 172 is passed through the mating plane 165 and body portion 149 to be inserted into a gusset 139 of a conjoining female fiber optics connector 104. The alignment pin insertion hole 174 may be of a specific diameter that specifically accepts the center guide pin 172, allowing for rotation of the fiber optic connector 102 and helping to achieve optimal alignment and connectivity performance. The diameter may be similar in diameter and length to the gusset 139, such as 1.5-2.0 mm in diameter, and 15 mm in length. (rec. 1.5-2 mm diameter, length 15 mm).

As illustrated in FIG. 3, the male fiber optics connector 102 is positioned to be coupled to the female fiber optics connector 104. The male fiber optics connector 102 has the male center guide pin 172 disposed into a center of the circular ferrule 135A. The female fiber optics connector 104 has the receiving gusset 139 to receive the center guide pin 172 and complete a coupling of the two connectors 102 and 104. The gusset 139 is disposed on the circular ferrule 135B and rotatable coupler 330B.

The center guide pin 172 is easily removable and replaceable such that gender changes can be performed without the need to disassemble the connectors 100 or their components. The center guide pin 172 may be of a specific diameter and length to achieve optimal alignment and connectivity performance. For example, the center guide pin 172 may be on the order of 1.5 to 2.0 mm in diameter having a length of about 15 mm.

The receiving gusset 139 may be of a specific diameter that specifically accepts the center guide pin 172, allowing for the rotation of the rotatable coupler 330A as it is inserted into the bulkhead adapter port 151 of the bulkhead adapter 150. The receiving gusset 139 of a receiving female fiber optic connector 104 helps to achieve optimal alignment and connectivity performance. The diameter of the receiving gusset 139 may be similarly sized to the center guide pin 172, on the order of, but slightly larger than 1.5 to 2.0 mm in diameter having a length of about 15 mm.

The receiving gusset 139 may be conductive to complete connectivity with the mated center guide pin 172 providing an additional or supplementary source of connectivity within the connector in addition to the fiber optic strands.

In addition to fiber optic connection, the fiber optic connectors 100 described herein have multimedia capabilities. The fiber optic connectors 100 have an additional feature, where the center guide pin 172 or multiple fiber plane 140 design can be made of or used to contain a separate connectivity media type such as copper, a variation of fiber optics or other media, to grant the connector the capability of supporting multimedia connectivity within a single connection. The center guide pin 172 can be used to support copper cabling connectivity as it inserts directly into the gusset 139 of another mated fiber optics connector 100. Also, each individual fiber plane 140 can host a separate and different embedded media type in parallel to the primary fiber plane and embedded bank(s) of fiber strands 143.

The circular and round shape of the ferrule face 137 provides several beneficial attributes such as providing a large mating surface area to provide good space efficiency per fiber strand. As illustrated in FIG. 2, the circular ferrule 135 houses at least one sector shaped fiber plane 140 that have parallel and opposing formations in opposing fiber optic connectors which provide easy "on the fly" polarity adjustments/flips. The circular ferrule 135 allows for twistand-return action of the rotatable coupler 130 for spaceless fastening and releasing of the fiber optics connector 100 from the bulkhead adapter 150.

FIG. 4 illustrates another mating connection of fiber optic cable connectors 202 and 204 through another bulkhead adapter 250 in accordance with FIG. 1. As an alternative to the arrangement illustrated in FIG. 3, as described herein, an alignment groove 261A may be disposed in a rotatable coupler 230A of a fiber optic connector 202 and a second alignment groove 261B may be disposed in a rotatable coupler 230B of a fiber optic connector 204. The rotatable coupler 230A may rotate about an alignment pin 262A disposed in a bulkhead adapter port 251A. The rotatable coupler 230B may rotate about an alignment pin 262B in a bulkhead adapter port 251B. Other common features previously described with reference to FIGS. 1, 2, and 3 also apply to the embodiment of FIG. 4, including but not limited to the cleaning media placement in the ferrules or body portion.

The twist-and-return actions of embodiments described herein are described in accordance with FIG. 1. As illustrated in FIG. 1, columns I and II, row "A" may denote an uncoupled stage of the fiber optic connector 100 and the bulkhead adapter 151, and an uncoupled position of the fiber optic connector 200 and the bulkhead adapter port 251. The alignment token track/grooves 161, 163, 261, and 263 may be configured to have an initial straight portion (along an axis "Z") that is disposed perpendicular to a cross-section of respective bulkhead adapter port 151 perimeter. In a row "B" stage, the fiber optic connector 100 may be initially coupled to the bulkhead adapter port 151. Alternatively, the fiber optic connector 200 may be initially coupled to the bulkhead adapter port 251. For further coupling, in a row "C" stage, the alignment token track/grooves 161, 163, 261, and 263 include a diagonal portion for further insertion of the fiber optics connectors 100 and 200. The diagonal portions guide a turning motion of the rotatable couplers 130 and 230 within the respective bulkhead adapter ports 151 and 251. In stage "D," to achieve a locking or fully mounted configuration in the first and/or second alignment token track/grooves 161 or 163, and/or 261 and 263, the alignment tracks may conclude with a straight portion (along axis "X") that is parallel to the cross-section of the bulkhead adapter port 151 and 251 perimeters. Spring tension in the rotatable couplers 130 or 230 may increase in row "C" as the rotatable couplers 130 or 230 are rotated along the diagonal path. Upon release into the straight groove in row "D," the rotatable couplers 130 or 230 may become securely held within the bulkhead adapter ports 151 or 251, biased by internal springs of the rotatable couplers 130 or 230.

According to embodiments described herein, once a fiber optic connector 100 is mounted within a bulkhead adapter 150, various connections may be made between one fiber optic strand bank 143 and another. The circular ferrules 135 may accept multiple possible arrangements for banks of fiber optic strands. Fiber strands may be in a fiber bank 143 having the shape of a trapezoid, referred to as a sector. This sector enables a wider portion of the trapezoid to align with an arc of the circular ferrule 135 and a narrow portion of the trapezoid to match with a narrower arc on along the center guide pin 172 or receiving gusset 139. The trapezoid sector shape may permit a precise alignment of banks of fiber strands 143 when mated, and at a higher quantity of fiber strands versus conventional flat row formats. The fiber plane 140 is a designated area on the ferrule face 137 where bank(s) of fiber strands 143 are contained and aligned. More than one fiber bank 140 may be provided within a fiber optic connector 100. The fiber plane 140 is also a targeted area of media cleaning/wiping.

The fiber plane 140 is the area on the ferrule face 137 that is used to house the embedded bank(s) of fiber strands 143. The trapezoid sector shape allows for radial or flat formation/orientation of bank(s) of fiber strands 143 providing greater precision in fiber strand alignments between mated fiber optic connectors 100.

The trapezoid shape of the fiber plane 140 allows for the cleaning/wiping of media 145 used to wipe an opposing surface of the fiber plane 140 and embedded bank(s) of fiber strands 143, during the twist-and-release movement of the fiber optics connectors 100. The fiber planes 140 can be positioned on the circular ferrule 135 in parallel, diametric, and quad orientations to mirror fiber strand formations, allowing for easy polarity changes or flips without the need to modify or remove the rotatable coupler 130.

According to embodiments described herein, there may be multiple layout orientations of radial banks of fiber strands 143. A bank of fiber strands 143 is a grouping and formation within the fiber plane 140. The bank of fiber strands 143 are precisely aligned to mate and marry to an adjoining fiber optic connector 100 in order to complete fiber optics connectivity of two or more cables connected together, and/or cables to a patch panel, source, or destination panel.

The circular ferrule face 137 has a large mating surface area to connector body ratio. Embodiments described herein include high fiber strand count at low loss. The result is higher fiber optics connectivity performance (>0.03 db) at quantities exceeding 48 strands. Superior fiber alignment performance is enabled having very high strand counts to provide a significant increase in both fiber strand quantity and density per connector.

Figure 5A:
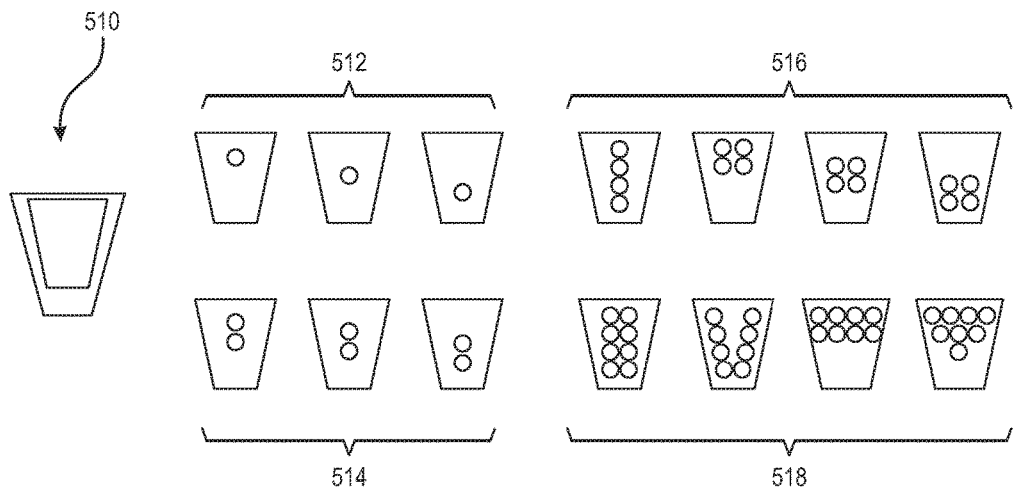
FIGS. 5A-5C illustrate example fiber banks and fiber optic strand formations in accordance with embodiments described herein.
Figure 5B:
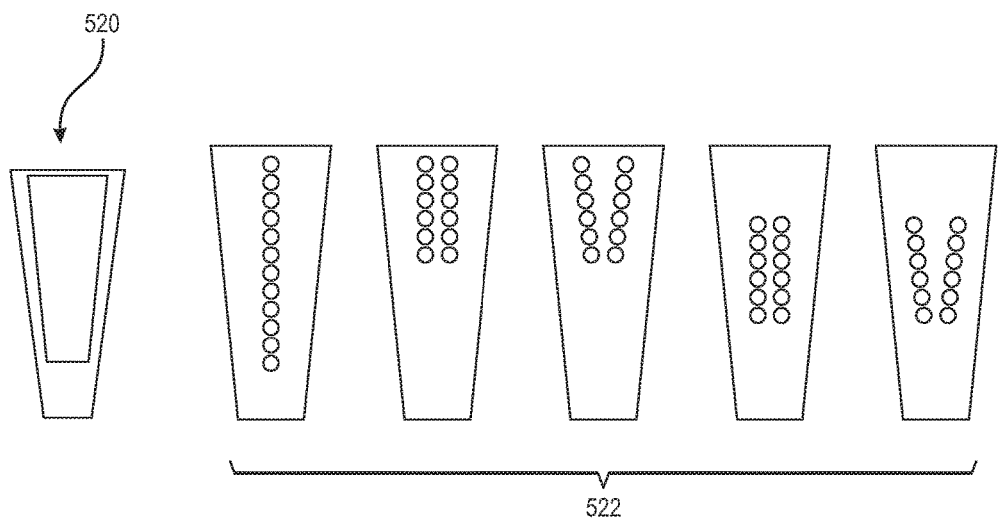
Figure 5C:
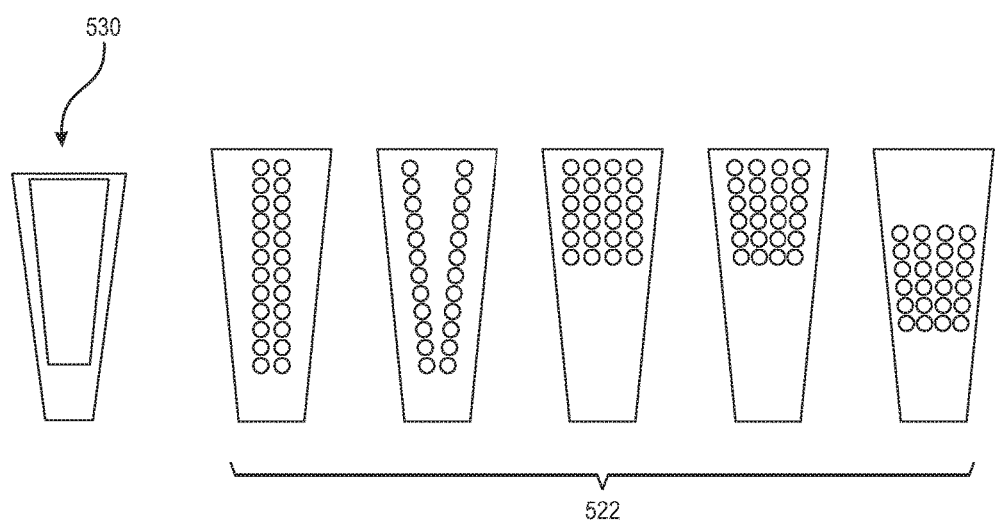

FIGS. 5A-5C illustrate example fiber banks and fiber optic strand formations in accordance with embodiments described herein. FIG. 5A illustrates different variations of a duplex and quad small form-factor pluggable (QSFP) fiber connector 510 in accordance with embodiments described herein. A first group 512 represents different configurations of a one strand fiber orientation that may be used according to embodiments described herein. Each strand may include numerous smaller strands embedded therein. A second group 514 represents different configurations of a two strand fiber orientation that may be used according to embodiments described herein. A third group 516 represents different configurations of a four strand fiber orientation that may be used according to embodiments described herein. A fourth group 518 represents different configurations of an eight strand fiber orientation that may be used according to embodiments described herein. One skilled in the art may be able to determine alternative arrangements for the one, two, four, and eight strange fiber orientations without deviating from the spirit of the implementations presented herein, given the trapezoidal shape of the disclosed fiber sectors.

FIG. 5B illustrates different fiber strand orientations of a high density fiber connector 520 in accordance with embodiments described herein. As illustrated in FIG. 5B, the high density fiber connector 520 may include various configurations for a twelve strand fiber orientation. Particular arrangements are not limited thereto. One skilled in the art may be able to determine alternative arrangements for the twelve strange fiber orientations without deviating from the spirit of the implementations presented herein, given the trapezoidal shape of the disclosed fiber sectors.

FIG. 5C illustrates different fiber strand orientations of a super high density fiber connector 530 in accordance with embodiments described herein. As illustrated in FIG. 5B, the super high density fiber 530 may include various configurations for a twenty-four strand fiber orientation. Particular arrangements are not limited thereto. One skilled in the art may be able to determine alternative arrangements for the twenty-four strange fiber orientations without deviating from the spirit of the implementations presented herein, given the trapezoidal shape of the disclosed fiber sectors.

The fiber planes 140 and banks of fiber strands 143 may be cleaned as described herein. As illustrated in FIG. 1, the circular ferrule 135 may further house the cleaning media agent 145 used to wipe the surface of the fiber planes 140 and embedded banks of fiber strands 143, during fastening and release of the fiber optics connector 100 to the bulkhead adapter 150.

A cleaning media may be used in the circular ferrules 135 to swipe or wipe the fiber plane(s) 140 and bank(s) of opposing fiber strands 143 of an opposing fiber optics connector during a twist-and-return fasten and release process of the fiber optics connector 100 to the bulkhead adapter 150, ensuring a clean and debris free connection between two connector interfaces. This is made possible by the capability of embedding a cleaning media agent 145, on either the connector circular ferrule 135 or bulkhead adapter 150, that performs a preemptive wiping/cleaning of the surfaces of the bank(s) of fiber strands 143 as part of the coupling process, and removing any contaminants that may get trapped or embedded between the mated fibers in the bank(s) of fiber strands 143.

The circular ferrule 135 may include injection port holes (not illustrated) for injecting a liquid or semi-solid cleaning media agent 145 that can saturate a wiping media of the fiber plane 140 which may aid in cleaning debris off of the fiber plane 140 and bank(s) of fiber strands 143. The injection port holes may also be used as a push through to remove the wiping media so it can be replaced.

The cleaning media agent 145 may be formulated to specifically fit within the circular ferrule 135 and bulkhead adapter 150 mating surface area. The cleaning media agent 145 may also be made of a cloth or brush material that may not scratch the ferrule face 137 or fiber plane 140 surface and also attract yet not release debris and contaminants as the cleaning media agent 145 performs the wiping process. The cleaning media agent 145 may be easily removed and replaced on either the circular ferrule 135 or bulkhead adapter 150.

Tools and detergents can be implemented to cleanse the cleaning media agent 145 on the fiber optics connector 100 or bulkhead adapter 150, ensuring that residual debris may not end up causing cross contamination if the fiber optics connectors 100 are frequently connected or disconnected.

Figure 6:
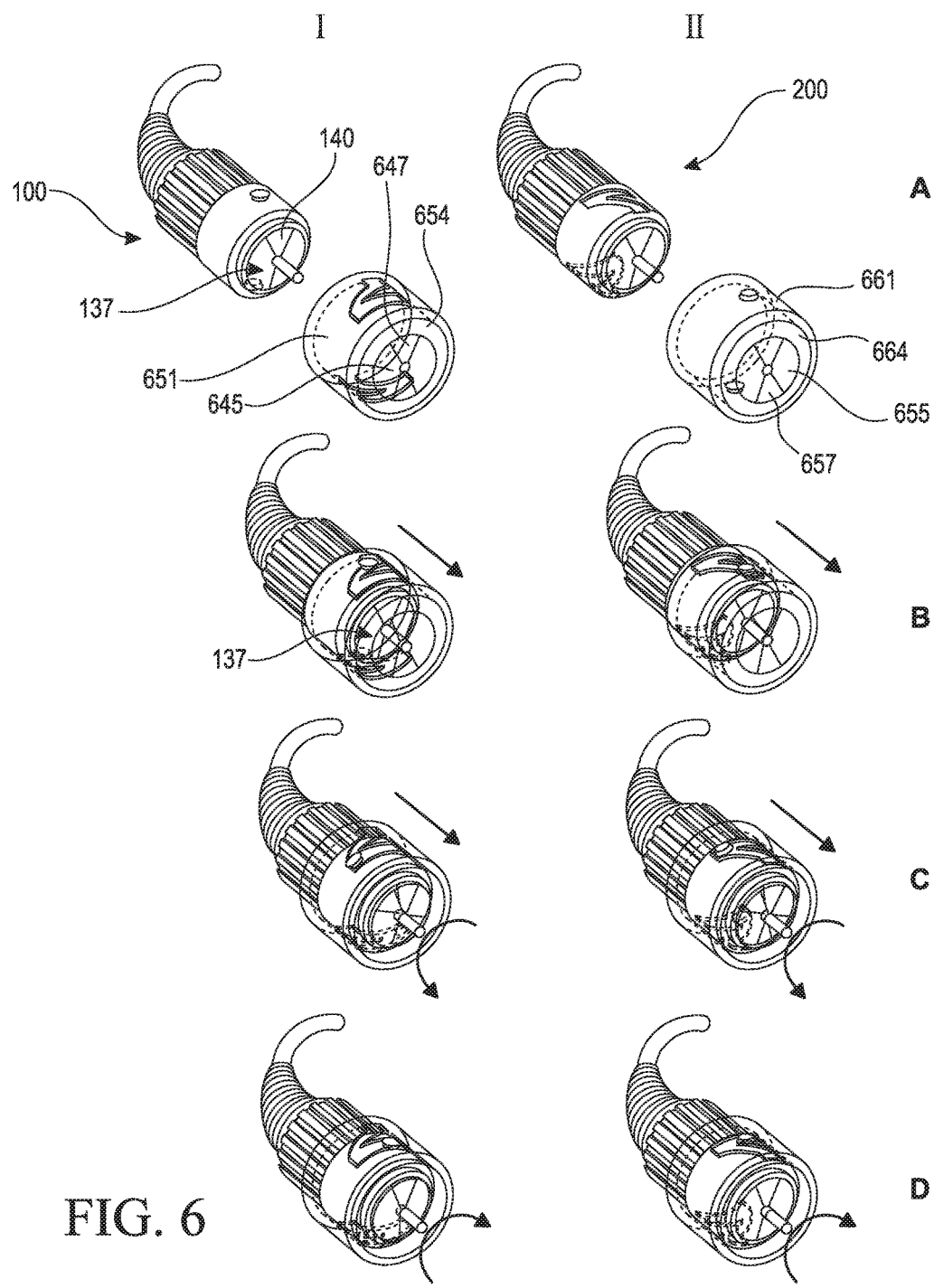
FIG. 6 illustrates use of a cleaning media agent on a bulkhead adapter shroud in accordance with embodiments described herein.

FIG. 6 illustrates use of a thin cleaning media agent 645 on a bulkhead adapter port 651 in accordance with embodiments described herein. In FIG. 6, column I, a thin cleaning media agent 645 may be disposed on an end face 654 of the bulkhead adapter port 651. Similarly, in column II, a thin cleaning media agent 655 may be disposed on an end face 664 of the bulkhead adapter port 661. The cleaning media agents 645 and 655 are sufficiently thin so the ferrule faces of both connectors can be placed in close proximity such that their adjoining fiber plane and fiber strands can complete optical connectivity. The shape of the cleaning media agents 645 and 655 on the end face 664 may be configured to support a complete wiping and cleaning of the ferrule face during the rotate and return action of the connector's insertion or release. The cutout gaps 647 and 657 utilize the remaining space of the end face 664 and may be shaped to fit the ferrule faces 137 and fiber banks 140. The cutout gaps 647 and 657 are thus shaped so that fiber planes 140 may extend through the cutout gaps to expose the cleaned tips of the fiber strands to mate with fiber strands of an opposing connector within the bulkhead adapter.

Referring to column I, a fiber optic connector 100 may be loaded into the bulkhead adapter port 651 in a similar manner to the mounting a rotation described regarding FIG. 1. Row "A" illustrates an uncoupled stage. Row "B" illustrates a first coupling stage. In row "C," during a rotation stage along the diagonal portion of the alignment track(s)/groove(s), the fiber plane 140 is moved closer to the cleaning media agent 645 of the bulkhead adapter port 651. At the end of the diagonal alignment groove, the fiber plane 140 has been fully rotated and pushed forward to be flush with the cleaning media agent 645. Upon release of the rotatable coupler 130 during stage "D", the cleaning agent 545 brushes against the bank(s) of fiber strands 143 that are exposed in the fiber planes 140, attracting and extracting dirt and debris as the cleaning media agent 545 wipes the surface of the fiber plane 140. This action of wiping the fiber plane 140 occurs whether there are one, two, four, or more fiber planes exposed on a ferrule face, in accordance with embodiments described herein.

Embodiments described herein provide for flexible fiber strand orientation flips and quick polarity changes. The design of the fiber optic connector 100 described herein has the ability to flip or reverse polarity of banks of fiber strand 143 sequencing/formations, without the need to disassemble or modify the fiber optic connector 100 or its components. This is performed by simply inserting the fiber optic connector 100 upside-down or right-side up into the bulkhead adapter 150. The inverted insertion capability is made possible by the alignment tokens 162, 164, 262, and 264 and/or the alignment track/grooves 161, 163, 261, and 263 placement on opposing sides of the rotatable coupler 130 and bulkhead adapter 150, which can accept the fiber optic connector 100 being inserted either orientation.

Figure 7A:
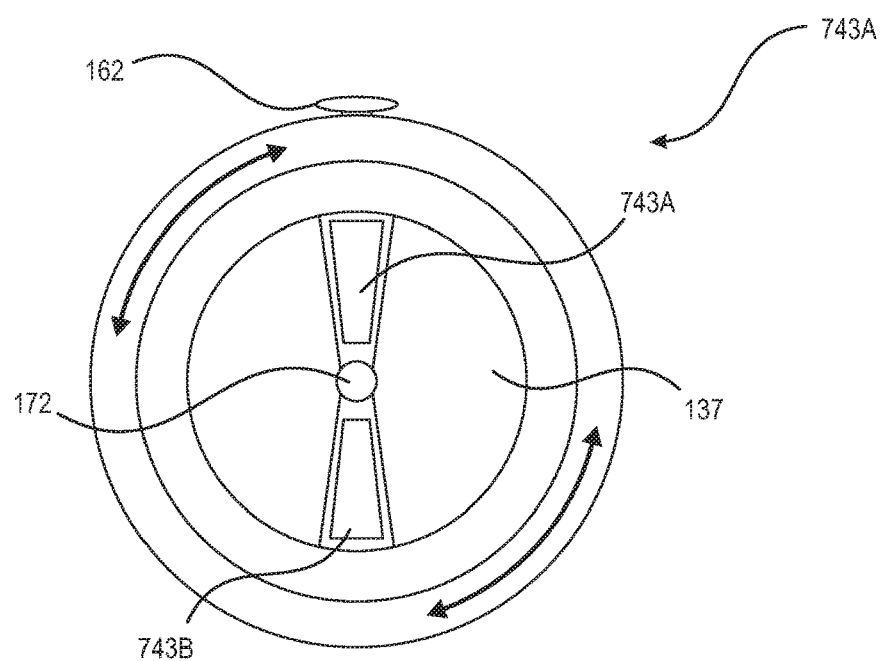
FIGS. 7A and 7B illustrate multiple fiber bank configurations embedded in the fiber optic connector in accordance with embodiments described herein.
Figure 7B:
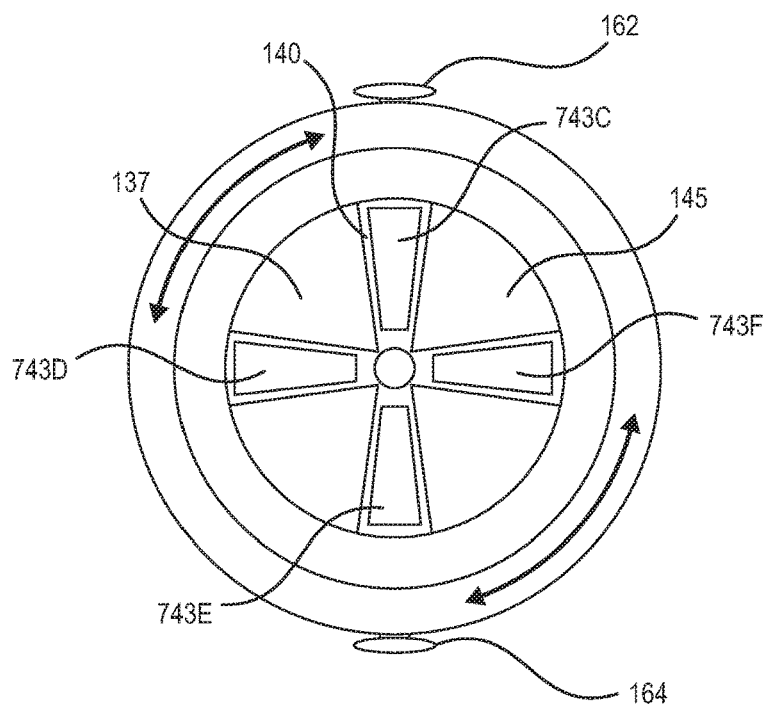

FIGS. 7A and 7B illustrate multiple fiber bank configurations embedded in the fiber optic connector in accordance with embodiments described herein. In order to increase the number of fiber strand connections, multiple fiber banks of fiber strands may be used in a single connector. FIG. 7A illustrates a scenario in which twenty-four to forty-eight fiber strands may be used. First and second banks of fiber strands 743A and 743B may be used to increase a quantity of connectivity of a fiber optic connector 100. The fiber optic connector of FIG. 7A may thus have a mirrored fiber plane layout. Both banks of fiber strands 743A and 743B have the sector trapezoidal shape, maximizing the space within the circular ferrule face 137. A first fiber bank FIG. 7A illustrates the use a single alignment token 162, but embodiments are not limited thereto. A second alignment token could be used to increase the connectivity of the fiber optic connector 100.

FIG. 7B illustrates a scenario in which forty-eight to ninety-six fiber strands may be used in a mirrored layout of four banks of fiber planes 743C, 743D, 743E, and 743F. As illustrated in FIGS. 7A and 7B, the circular ferrule faces 137 with the mirrored fiber plane layout orientation allows for easy polarity changes/flips without the need to modify or remove the connector housing, achieved by simply inserting the fiber optic connector 100 upside down or right-side up into a bulkhead adapter (not illustrated). 6B further illustrates and includes the cleaning media agent 145 disposed between the fiber planes 140.

Figure 8:
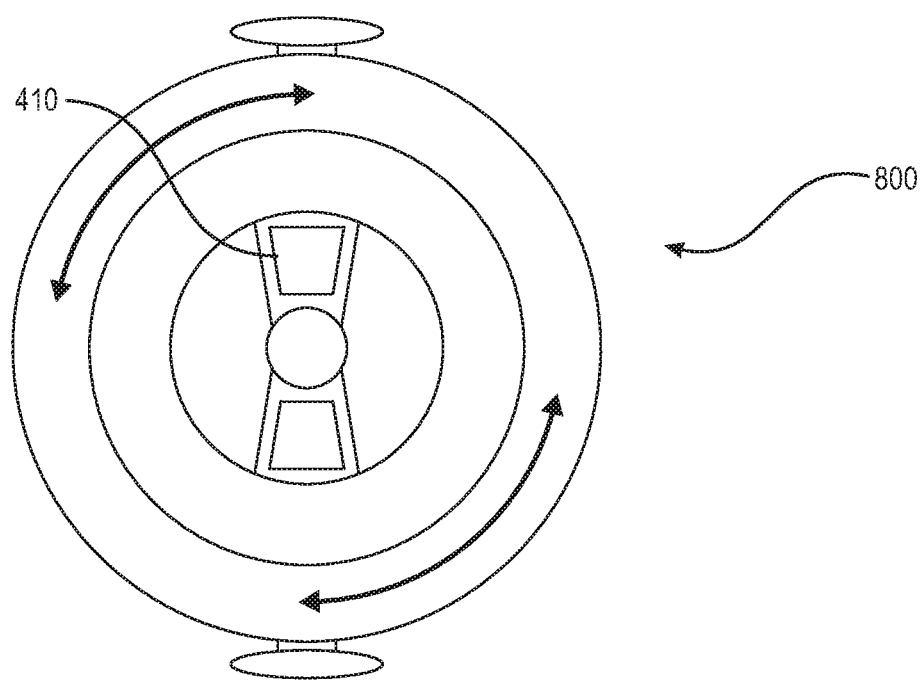
FIG. 8 illustrates a smaller form factor fiber optic connector in accordance with FIG. 5A.

FIG. 8 illustrates a smaller form factor fiber optic connector 800 in accordance with FIG. 4A. In the embodiments illustrated in FIGS. 7A and 7B, any of the banks of fiber strands illustrated in FIG. 4B, or 4C may be used. In case the smaller fiber banks illustrated in FIG. 4A are used, a smaller fiber optic connectors such as the one illustrated in FIG. 8 with smaller ferrules and smaller ferrule faces may be used accordingly. Likewise embodiments described herein include a compatible bulkhead adapter to support the smaller form factor fiber optic connectors and ferrules. The smaller form factor illustrated in FIG. 8 may host duplex and Quad Small Form-factor Pluggable (QFSP) fiber formations. A larger form factor connector 700 illustrated in FIGS. 7A and 7B may host high density and super high density fiber formation.

A method of operation of the fiber optic connectors 100 described herein may be described with reference to the illustrated figures. With reference to FIG. 1, column I, and FIG. 2, when a user desires to connect fiber planes 140 on a male fiber optic connector 102 to a female fiber optic connector 104, several steps may be undertaken. There is no designated order of connection. A male 102 or female 104 fiber optic connector may be connected first or second. On the side of the male fiber optic connector 102, a user may grab onto the connecting grip portion 132 of the male fiber optic connector 102. If a single alignment token 162 is present on the male fiber optic connector 102, the user may align the alignment token 162 with the alignment track/groove 161. To begin coupling the male fiber optic connector 102 to the bulkhead adapter 150, the user must push the rotatable coupler 130 forward into the initial straight portion of the alignment track/groove 161 on the bulkhead adapter port 151 of the bulkhead adapter 150.

When the user continues to push the rotatable coupler 130 forward, the second portion of the alignment track/groove 161, the angled portion thereof, may force the user to rotate the rotatable coupler 130 in a clockwise or counterclockwise direction, depending on an orientation of the alignment track groove 161. The fiber optic cable 105, boot portion 110, and fixed body portion 120 may not rotate. The rotatable coupler 130 may begin to rotate preloaded by an internal spring mechanism, where preload tension of the spring increases as the degree of rotation increases. When the user turns the rotatable coupler 130 to a point in the alignment track/groove 161 that stops the movement thereof, the user may release the tension on the spring, and the alignment token 162 may move along the final straight portion of the alignment track groove 161 to come to rest position within the bulkhead adapter port 151 of the bulkhead adapter 150. This movement is referred to herein as the fasten-and-release mechanism, or twist-and-release movement. The configuration and movement succeeds in firmly loading and holding a fiber optic connector 100 into a bulkhead adapter port, such that fiber planes 140 of fiber optic connectors 100 may be properly aligned for mating and signal communication. If there is a cleaning media agent 145 installed in the mating plane 165 of the bulkhead adapter 150, the fiber planes 140 and bank(s) of fiber strands 143 may be cleaned as the fiber optic connector 100 is being mounted. When unfastening a fiber optic connector 100, the insertion movements may be reversed including compressing and release of the internal spring mechanisms to de-couple a fiber optic connector 100 from a bulkhead adapter 150.

As illustrated in the accompanying figures, more than one alignment token and alignment groove may be used to provide additional security to the system. Also, alternatively, the rotatable coupler 130 may include alignment grooves while the bulkhead adapter port includes the alignment tokens, as illustrated in column II of FIG. 1, and a similar mounting method may be performed.

Embodiments described herein thus provide a high density fiber strand and low loss connectivity solutions. The culmination of unique fiber optic connector 100 components including but not limited to a large circular ferrule, sector shaped fiber planes, radial banks of fiber strands, a center guide pin and gusset, alignment tokens, and tracks/grooves, results in a precise alignment of fiber strands when fiber optic connectors 100 are mated, and at a higher quantity of fiber strands. The result is higher fiber optics connectivity performance (>0.03 db) at fiber strand quantities up to and exceeding forty-eight fiber strands.

The fiber optic connectors 100 having a circular and cylindrical shape and a rotatable couplers, allows for the "twist-and-return" action described herein for fastening and releasing the fiber optic connectors from a bulkhead adapter port. This feature has the added benefit of allowing handling of the fiber optic connectors to be performed away from a connector head or bulkhead adapter port, reducing the overall footprint of the fiber optic connector and allowing for a tighter grouping and higher population of ports per patch panel.

FIGS. 9 and 10A-10C illustrate rotatable shroud couplers 930 having fixed circular ferrules 935 in accordance with embodiments described herein. The rotatable shroud coupler 930 is a variation of the rotatable coupler 130 described previously. The rotatable shroud coupler 930 includes an elongated covering and provides protection to the circular ferrule 935, ferrule face 937, fiber planes 940 and the center guiding pin 972. As illustrated in this embodiment, the circular ferrule 935 includes a cylindrical shape and protrudes out of the rotatabe shroud coupler 930 when the rotatable shroud coupler 930 is inserted into the bulkhead 950.

The rotatable shroud coupler 930 further includes a shroud disc 944 at one end thereof that can host a cleaning media 945. The shroud disc 944 of rotatable shroud coupler 930 the includes the cleaning media 945 adjacent cutout gaps 947 in which to receive the bank(s) of fiber strands extending through the ferrule face 937 after they are wiped and cleaned. The shroud disc 944 of the rotatable shroud coupler 930 is disposed on an end of the rotatable shroud coupler 930 opposite the connecting grip 932. The shroud disc 944 is removable from the rotatable shroud coupler 930 for general maintenance, repair or replacement.

Similar to other embodiments, the rotatable shroud coupler 930 may have an alignment token 962 disposed thereon to be received within a track or groove 961 of a bulkhead adapter 950. The track or groove 961 may have a different shape than an alignment groove 261 described in other embodiments. The track 961 may have an initial straight portion, a slanted portion, and another straight portion. The shapes of these grooves are interchangeable and the depiction and description thereof are not meant to be limiting in terms of couplers that may be securely fastened to a bulkhead adapter. The rotatable coupler 930 may be spring loaded.

Different stages of insertion of rotatable shroud couplers are illustrated in column I and II, stages A through D. As illustrated in column I, and transitioning from stage A to stage D, a fiber optic cable 105 connected to the rotatable shroud coupler 930 is inserted into the bulkhead adapter 950. The stages A to D are not rigid demarcation points. The depictions and descriptions of these stages A to D are meant to represent a continuous movement of parts, from an initial insertion, cleaning, to a secure connection.

From stage A to stage B, an initial coupling takes place. The rotatable shroud coupler 930 may be inserted into the bulkhead adapter 950 as the alignment token 962 is inserted into a first straight portion of the track 961. From stage B to stage C, the rotatable shroud coupler 930 does not yet rotate as the circular ferrule 935 is pushed through and protrudes from within the rotatable shroud coupler 930 until it comes into contact with the cleaning media 945. In this embodiment, the orientation of the fiber planes 940 having fiber strands therein within the circular ferrule 935 are fixed and do not rotate.

Upon further insertion by a user from stage C to stage D, the alignment token 962 of the rotatable shroud coupler 930 is forced into rotation along the track 961 such that the cleaning media 945 of the shroud disc 944 is wiped over the fiber planes 940 and banks of fiber strands included therein to clean and sanitize the fiber strands. This cleaning allows the fiber strands to be clear of dirt and debris and establish clearer lines of communication. After cleaning, the fiber planes 940 fit within the cutout gaps 947 of the shroud disc 944. A single trapezoid set is illustrated in row D, representing the fiber planes 947 extending through the cutout gaps 947. The guiding pin 972 of the rotatable shroud coupler 930 is able to marry with a receiving gusset of an opposing fiber optic coupler within an opposite side of the bulkhead adapter. This rotation exposes the fiber strands alongside the guiding pin 972 for marrying the adjoining connector within the bulkhead adapter 950. The other side of the bulkhead adapter 960 may receive any one of the coupler/ferrule combinations described herein.

Figure 9:
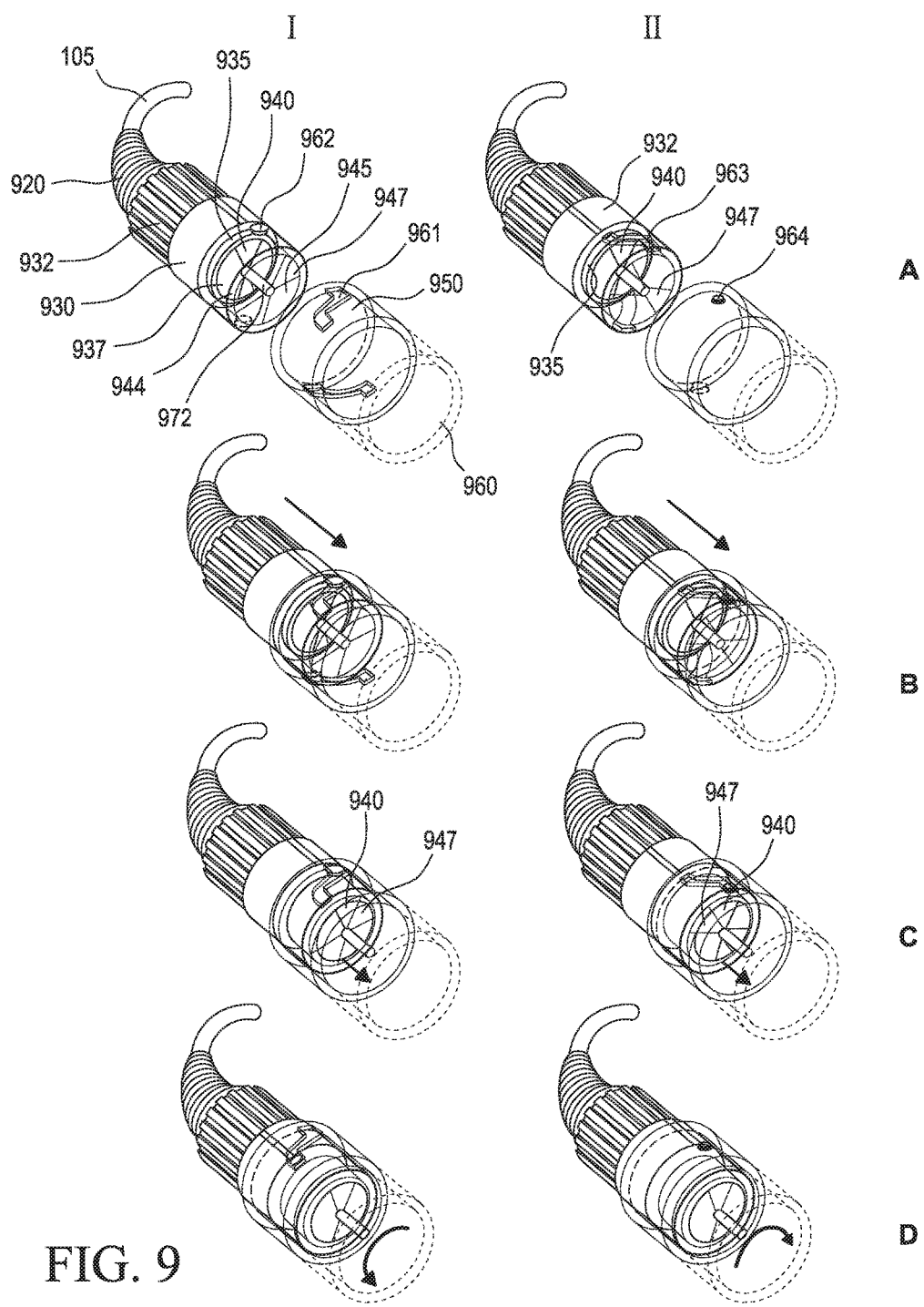
FIG. 9 illustrates perspective views of rotatable shroud couplers having fixed circular ferrules in accordance with embodiments described herein.

Column II of FIG. 9 illustrates another embodiment of the rotating shroud coupler 932 in which a second alignment groove track 963 is disposed on the rotatable shroud coupler 932 and an alignment pin 964 is affixed to the bulkhead adapter 950. Insertion, rotation, and cleaning of the circular ferrule 935 mimics the embodiment of column I in which the shroud disc 944 is rotated over the fiber strands of the circular ferrule 935 to prepare the fiber strands for dirt-free mating.

Figure 10:
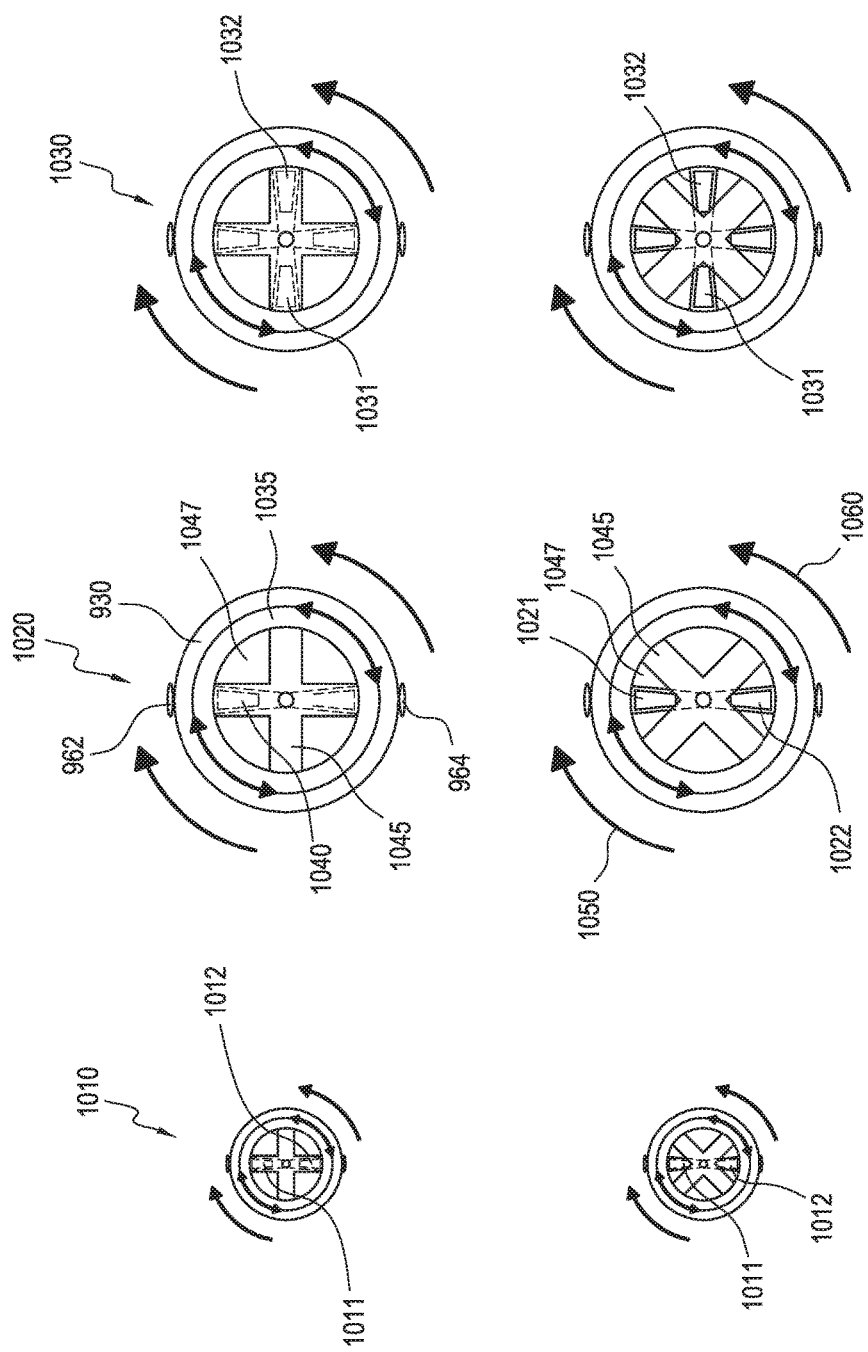
FIGS. 10A-10C illustrate front views of various rotating shroud couplers in accordance with FIG. 9.

FIGS. 10A-10C illustrate front views of various rotating shroud couplers in accordance with FIG. 9. As described herein, multiple form factors may be used. FIG. 10A illustrates two positions of a duplex or QFSP cable connector 1010 which may utilize one to four fiber strands per fiber bank 1011 and 1012 for a total capacity of two to eight fiber strands. The upper position of FIG. 10A denotes a starting or ending point of rotation of a shroud disc of the rotatable shroud coupler. The lower position of FIG. 10A denotes a rotated position in the bulkhead adapter 950. The form factor of FIG. 10A may referred to as a small "S" body.

FIG. 10B illustrates a high density (HD) version of the cable connector 1020 in a larger "L" body format that includes two opposing fiber banks 1021 and 1022 each hosting 12-24 fiber strands for a total capacity of up to 48 strands per connector. The upper position of FIG. 10B denotes a starting or ending point of rotation of the ferrule face as opposed to the shroud disc with cleaning media 1045. The lower position of FIG. 10B denotes a rotated position of the ferrule face and shroud disc with cleaning media 1045 when completely inserted into the bulkhead adapter 950.

FIG. 10C illustrates a super high density (SHD) version of the cable connector 1020 which also utilizes the larger "L" body format 1030. The SHD cable connector 1030 adds an additional two fiber planes 1031 and 1032 to the embodiment of FIG. 10B. each plane hosting 12-24 fiber strands for a total capacity of up to 96 strands per connector.

The embodiments of FIGS. 10A, 10B, and 10C have similar components that will be described with reference to FIG. 10B. Each of the embodiments include a fixed ferrule 1035 and a shroud disc 1045 that can contain a cleaning media. The shroud disc 1045 is in the shape of a cross, having four segments, but configurations are not limited thereto. The cleaning/wiping media area may take the form of any polygon or shape in which to adequately wipe the bank(s) of fiber strands exposed via a ferrule face. These polygonal shapes are separated by cutout gap regions 1047 in which to receive the cleaned bank(s) of fiber strands. As illustrated in FIG. 9, the cleaning/wiping area 945 of the shroud disc 944 may include arced sections to correspond to shapes of the ferrule face 937. As illustrated in FIG. 9, when an alignment pin 962 traverses the track 961, the rotatable shrouded coupler 930 rotates to wipe the cleaning media 945 over the bank of fiber strands, and the ferrule 1035 remains fixed in place. After being cleaned, the banks of fiber strands 1021 and 1022 fit within the cutout gap regions 1047 that move when the shroud disc rotates, ready to mate with an opposing connector. The shroud disc 1045 is connected to an outer rim 1048 of a removable shroud disc 1044. A counter-clockwise turn 1060 may engage the rotatable shroud coupler 930 to a bulkhead 950, and a counter-clockwise turn 1050 may release the rotatable shroud coupler 930. Orientations of the alignment tracks and rotation of the rotatable shroud coupler 930 may be mirrored to provide opposite rotations thereof.

FIGS. 11 and 12A-12C illustrate fixed shroud couplers 1130 and rotating circular ferrules 1135 in accordance with embodiments described herein. The fixed shroud coupler 1130 includes a base portion adjacent the connecting grip 1132 and an extending shroud portion that covers the circular ferrule 1135. Upon rotation of the circular ferrule 1135, the circular ferrule 1135 may protrude out of the base portion of the shroud coupler and within the extended portion of the fixed shroud coupler for it to be cleaned and put into a mating position. The fixed shroud coupler 1130 provides protection to the front ferrule face 137, fiber planes 140 and the center guiding pin 172. The fixed shroud coupler 1130 further includes a shroud disc 1144 having cleaning media 1145 formed integrally within the shroud disc 1144. The shroud disc 1144 includes cutout gaps adjacent the cleaning media. The shroud disc 1144 of the fixed shroud coupler 1130 is disposed on an end of the fixed shroud coupler 1130 opposite the connecting grip 1132. The shroud disc 1144 is removable from the fixed shroud coupler 1130 for general maintenance, repair or replacement. The shroud disc 1144 of the fixed shroud coupler 1130 the includes the cleaning media 1145 adjacent cutout gaps 1147 in which to receive the bank(s) of fiber strands extending through the ferrule face of the ferrule 1135 after they are wiped and cleaned.

Figure 11:
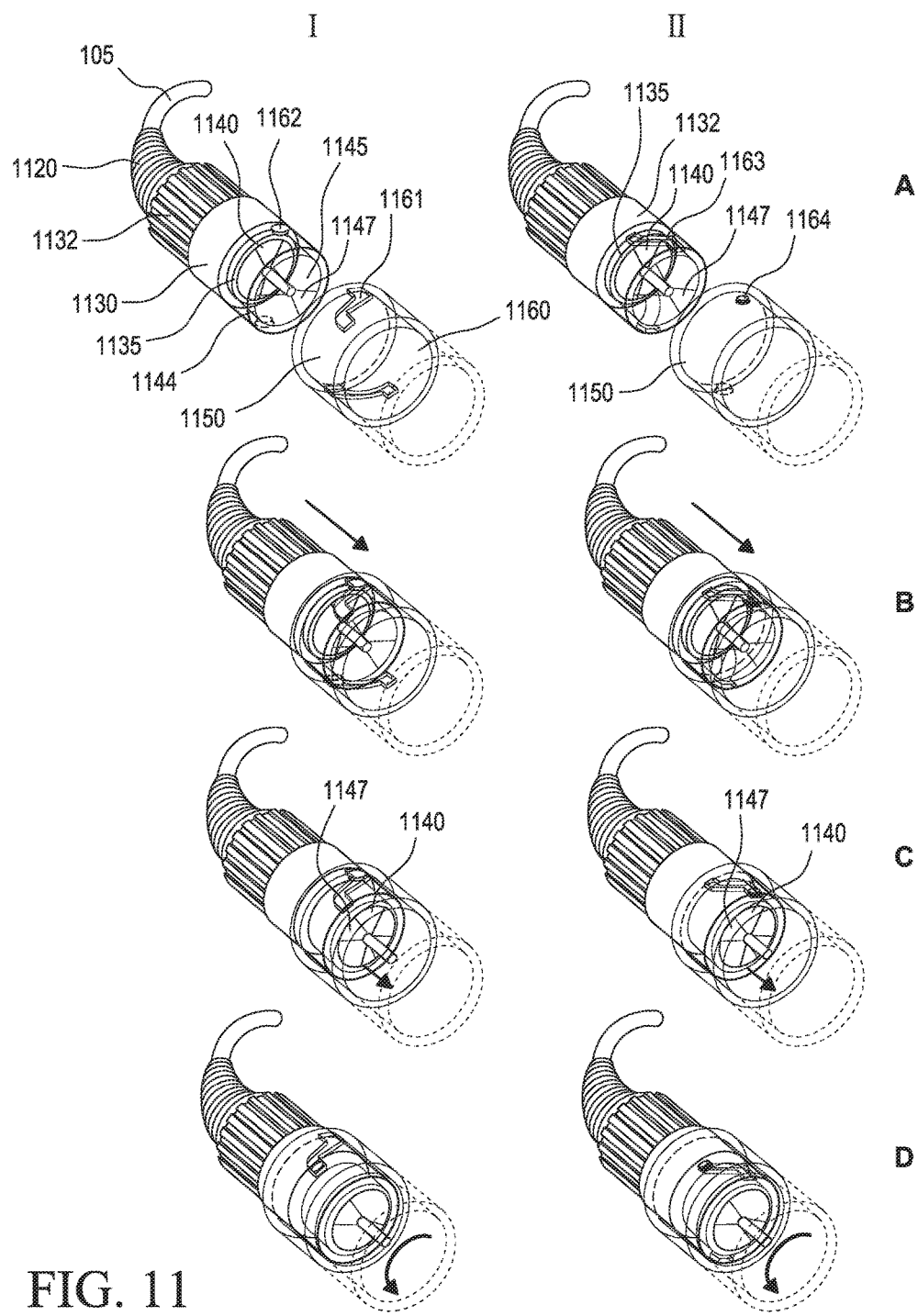
FIG. 11 illustrates perspective views of fixed shroud couplers and rotating circular ferrules in accordance with embodiments described herein.

Similar to other embodiments, the fixed shroud coupler 1130 may have an alignment token 1162 disposed thereon to be received within a track or groove 1161 of a bulkhead adapter 1150. Illustrated in FIG. 11 are two sides 1150 and 1160 of a bulkhead adapter in accordance with embodiments described herein. The track or groove 1161 may have varying shapes as described herein.

As illustrated in column I, and transitioning from stage A to stage D, a fiber optic cable 105 connected to the fixed shroud coupler 1130 is inserted into the bulkhead adapter 150. Again, the stages A to D are not rigid demarcation points, but represent different snapshots of the movement of the parts described and illustrated herein. From stage A to stage B, an initial coupling takes place. The shroud coupler 1130 is inserted into the bulkhead adapter 1150 and the alignment token 1162 is inserted into a first straight portion of the track 1161. From stage B to stage C, the circular ferrule 1135 does not yet rotate as the circular ferrule 1135 body is pushed through the shroud coupler 1130 until it mates with the cleaning media 1145. Throughout this embodiment, the orientation of the shroud coupler 1130 does not rotate. The fiber plane(s) 1140 within the circular ferrule 1135 do rotate.

Upon further insertion by a user from stage C to stage D, instead of the fixed shroud coupler 1130 rotating in the bulkhead 1150, it is the circular ferrule 1135 that rotates against the fixed cleaning media 1145 as the fixed shroud coupler 1130 is pushed into the bulkhead adapter 1150. The circular ferrule 1135 rotates and the shroud coupler 1130 with cleaning media 1145 remains fixed in place. In this embodiment, the rotation of the ferrule face 1137 wipes the bank(s) fiber strands against the cleaning media, effectuating cleaning and disinfecting as described herein. The pushing and rotation movement of the cylindrical and circular ferrule 1135 effectuates the cleaning action of the cleaning media 1145. This same pushing and rotation allows the banks of fiber strands in the fiber plane 1140 to fit within cutout gaps 1147 of the shroud disc 1144. A single trapezoid set is illustrated in row D, representing the fiber planes 1140 extending through the cutout gaps 1147. Though not illustrated there may be a second fiber optic cable and shroud coupler coupled to the other side of bulkhead adapter 1160 to establish connection with the fiber optic cable coupled to the fixed shroud coupler 1130. An opposing fiber optic cable may be coupled to any one of the couplers described herein such that a male guiding pin couples with a female gusset.

Column II of FIG. 11 illustrates another embodiment of a fixed shroud coupler 1132 and rotating circular ferrule 1135 in which a second alignment groove track 1163 is disposed on the fixed shroud coupler 1132 and an alignment pin 1164 is affixed to the bulkhead adapter 1150. In this case, when the shroud coupler 1132 is inserted into the bulkhead adapter 1150, the groove 1163 is inserted over the alignment pin 1164. Further insertion and rotation of the circular ferrule 1135 then mimics the embodiment of column I in which the circular ferrule 1135 is rotated against the cleaning media 1145 to clean the bank(s) fiber strands.

FIGS. 12A-12C illustrates front views of various fixed shroud couplers in accordance with FIG. 11. Multiple form factors may be used. FIG. 12A illustrates a duplex or QFSP cable S body connector 1210 which may utilize one to four fiber strands per fiber bank for a total capacity of two to eight fiber strands.

FIG. 12B illustrates a high density (HD) version of the cable connector in a larger "L" body format 1220 that includes two opposing fiber banks 1240 and 1241 each hosting 12-24 fiber strands for a total capacity of up to 48 strands per connector. The upper position of FIG. 12B denotes a starting or ending point of rotation of the ferrule face as opposed to the shroud disc 1244. The lower position of FIG. 12B denotes a rotated position of the ferrule face and shroud disc 1244 when completely inserted into the bulkhead adapter 1150.

FIG. 12C illustrates a super high density (SHD) version of the cable connector which also utilizes the larger "L" body format 1230. The SHD cable connector 1230 adds an additional two fiber planes 1251 and 1252 to the embodiment of FIG. 12B. each plane hosting 12-24 fiber strands for a total capacity of up to 96 strands per connector.

The embodiments of FIGS. 12A-12C have similar components that will be described with reference to FIG. 12B. Each of the embodiments include a rotatable ferrule region 1235 and a cleaning/wiping media area 1245. The cleaning/wiping media area 1245 is in the shape of a cross, having four legs, but is not limited thereto. The cleaning/wiping media area may take the form of any polygon or shape in which to adequately wipe the bank(s) of fiber strands exposed via a ferrule face. These polygonal shapes are separated by cutout gap regions 1247 in which to receive the cleaned bank(s) of fiber strands. The rotatable cylindrical and circular ferrule 1135 provides a ferrule face 1137 exposing bank(s) of fiber planes 1140. As illustrated in FIG. 11, when an alignment pin 1162 traverses the track 1161, the rotatable circular ferrule 1135 rotates against the cleaning media area 1245 to wipe the fiber strands over the cleaning media, and the fixed shroud coupler 1130 remains fixed in place. The pushing and rotating action then secures the rotatable circular ferrule 1135 within the cutout gaps 1247 of the removable shroud disc 1244, where the clean fiber strands are ready for mating with an opposing cable connector. The cleaning/wiping media area 1245 is connected to an outer rim of a removable shroud disc 1244. A counter-clockwise turn 1260 may engage the rotatable ferrule 1235 to a bulkhead 1150 triggering the wiping of the fiber strands, and a clockwise turn 1250 may release the rotatable ferrule 1235.

Although the various examples of one embodiment have been described in detail with particular reference to certain exemplary aspects thereof, it should be understood that embodiments described herein are capable of other embodiments and its details are capable of modifications in various obvious respects. As is readily apparent to those skilled in the art, variations and modifications can be affected while remaining within the spirit and scope of the embodiments. Accordingly, the foregoing disclosure, description, and figures are for illustrative purposes only and do not in any way limit the invention, which is defined only by the claims.

The invention claimed is:

1. A fiber optic connector assembly, comprising:
   a boot portion connected to a fiber optic cable;
   a fixed body portion connected to the boot portion;
   a rotatable coupler connected to the fixed body portion and configured to rotate about the fixed body portion;
   a ferrule connected to the rotatable coupler and configured to rotate with the rotatable coupler about the fixed body portion; and
   a bulkhead adapter configured to receive the rotatable coupler after the rotatable coupler has been turned in one direction and released in another direction.

2. The fiber optic connector assembly of claim 1, wherein the rotatable coupler includes at least one alignment token to interface with the bulkhead adapter port and the bulkhead adapter includes at least one alignment groove to interface with the rotatable coupler.

3. The fiber optic connector assembly of claim 1, wherein the bulkhead adapter port includes at least one alignment token to interface with the rotatable coupler and the rotating rotatable coupler includes at least one alignment groove to interface with the bulkhead adapter.

4. The fiber optic connector assembly of claim 1, wherein the ferrule of a first fiber optic connector includes a guiding pin or a receiving gusset to connect to a ferrule of a second fiber optic connector.

5. The fiber optic connector assembly of claim 4, wherein the guiding pin in the first fiber optic connector is removable and able to be placed into a receiving gusset of a second fiber optic connector to allow for fiber optic connector gender changes.

6. The fiber optic connector assembly of claim 1, wherein the bulkhead adapter includes an alignment pin insertion hole to receive a connection between a first fiber optic connector and a second fiber optic connector.

7. The fiber optic connector assembly of claim 1, wherein two alignment grooves are placed in opposing formations on either the rotatable coupler or bulkhead adapter to support quick polarity flips.

8. The fiber optic connector assembly of claim 1, wherein the ferrule includes at least one fiber plane and at least one bank of fiber strands.

9. The fiber optic connector assembly of claim 8, wherein two or four fiber planes are positioned in a mirror configuration to support quick polarity flips.

10. The fiber optic connector assembly of claim 8, wherein the ferrule face exposes at least two fiber planes multiplying the number of fiber planes and bank of fiber strands.

11. The fiber optic connector assembly of claim 1, further comprising a cleaning media agent disposed within the ferrule.

12. The fiber optic connector assembly of claim 1, further comprising a cleaning media agent disposed within the bulkhead adapter body.

* * * * *